Jan. 18, 1949.  G. T. BOYD ET AL  2,459,491
WIRE BOUND BOX CLOSING TOOL
Filed April 2, 1946
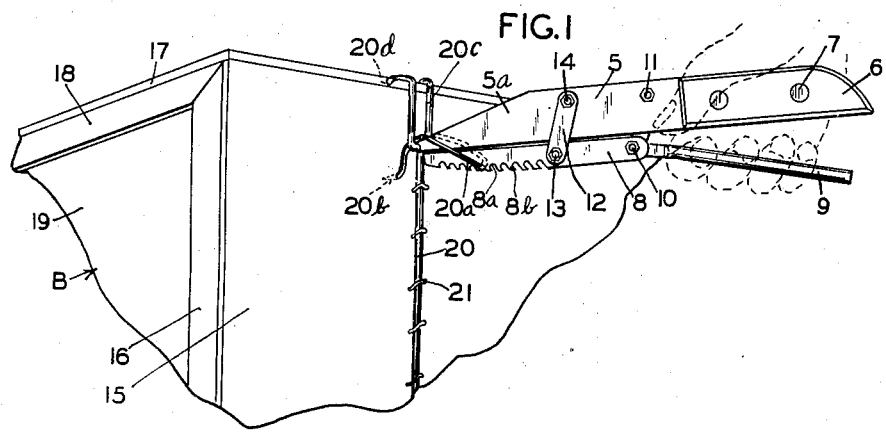
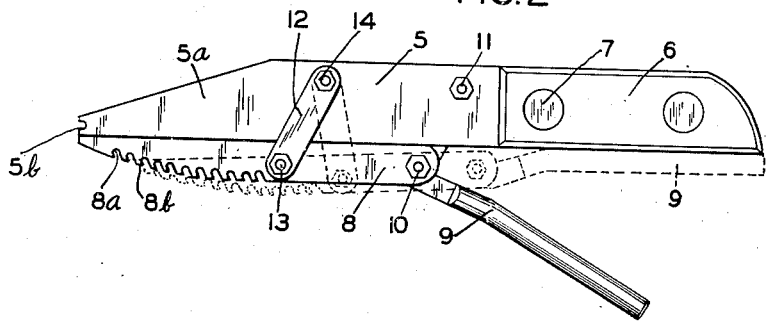
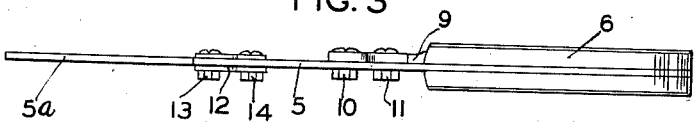
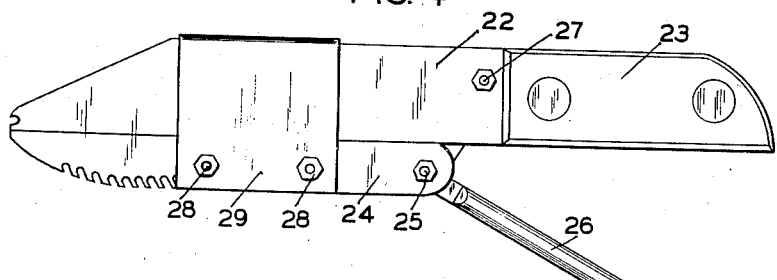
INVENTOR.
GEORGE T. BOYD
HENRY T. BOYD
BY
Williamson & Williamson
ATTORNEYS Patented Jan. 18, 1949

2,459,491

UNITED STATES PATENT OFFICE 2,459,491

WIRE BOUND BOX CLOSING TOOL

George T. Boyd and Henry T. Boyd, Albert Lea, Minn., assignors of one-fourth to Gerard A. Thompson, Minneapolis, Minn., and one-fourth to Robert I. Davies, Albert Lea, Minn.

Application April 2, 1946, Serial No. 658,950

3 Claims. (Cl. 140—123)

This invention relates to wire bound box closing tools.

It is one of the objects of this invention to provide novel, improved wire bound box closing tools so constructed that as a wire bound box is closed and one looped end of a wire binding the box together is drawn through the other looped end of the wire and crimped downwardly therefrom, the wire can be tautly tensioned as the crimp is being made.

The objects and advantages of the invention will more fully appear from the following description made in connection with the accompanying drawings wherein like reference characters refer to the same or similar parts throughout the various views and in which:

Fig. 1 is a perspective view showing a portion of a wire bound box with a tool embodying the invention in use for securing one of the wire bindings of the box.

Fig. 2 is a view in side elevation showing the tool illustrated in Fig. 1, certain of the parts being shown in one position in full lines and in the second position in dotted lines.

Fig. 3 is a plan view of the tool shown in Fig. 2; and

Fig. 4 is a view in side elevation illustrating a slightly different embodiment of the invention.

Referring first to the embodiment of the invention shown in Figs. 1, 2, and 3, there is illustrated a wire bound box closing tool including a fulcrum bar 5 having a tapered forward portion 5a terminating in a notched forward end 5b. The rear end of the fulcrum bar 5 forms a handle section to which hand grips 6 are secured as by rivets 7. One edge of the fulcrum bar 5 is straight, and working along this edge of the bar is a hooking bar 8, which curves at its outer edge towards a narrowed forward end, and along the forward portion of the outer edge of this hooking bar 8 a number of notches 8a are cut leaving hooking teeth 8b between these notches. A bell crank lever 9 is pivotally connected by the pivot bolt 10 to the rear end of the hooking bar 8, and one arm of this lever is pivotally connected to the fulcrum bar 5 by means of the pivot bolt 11. The remaining arm of the bell crank lever 9 is preferably of round cross-section, and it projects generally rearwardly from the rear end of the hooking bar 8 so that it can be readily grasped by the fingers of the hand of an operator for actuation of the lever while the same hand holds the handle portion and hand grips 6 of the fulcrum lever 5. Forwardly of the pivot bolt 10 a pair of links 12 located at opposite sides of the hooking lever 8 are pivotally connected thereto by the pivot bolt 13, and these links are also pivotally connected to the fulcrum bar 5 by a pivot bolt 14.

It will be seen that the hooking lever 8, as the bell crank lever 9 is swung, will have a longitudinal sliding movement relative to the fulcrum bar 5 and that, during the first part of the movement of the hooking bar 8 from the full line position shown in Fig. 2 to the dotted line position there shown, the forward portion of the bar will also have a lateral movement away from the fulcrum lever 5.

The manner of use of the tool described is shown in Fig. 1. In this view there are shown portions of a wire bound box B including a side wall 15 reinforced at its end by a strip 16, a top 17 reinforced at its end by a strip 18, and an end wall 19. One of several wires 20 employed for binding the box together is shown. This wire is secured as by staples 21 to the various walls of the box, and it has at one end a loop 20a formed therein terminating in a prong 20b which is pounded into the side 15 of the box. At its other end the wire 20 forms a second loop 20c, which terminates in a pronged portion 20d pounded into the top 17 of the box.

In closing the box B, the loop 20c of a wire, such as the wire 20, is carried downwardly over the side 15 of the box while the loop 20a is carried through the loop 20c. The tool described is grasped by the hand of the operator as shown in dotted lines, Fig. 1, whereupon the tapered forward end portion 5a of the fulcrum bar 5 of the tool is carried downwardly from above the loop 20a through the loop 20a, and the lower part of the loop 20c is engaged in the notch 5b at the forward end of the fulcrum bar. As this is done, the outer portion of the loop 20a is engaged within one of the notches 8a of the hooking bar 8 so that an adjacent hook 8b catches the loop 20a. Thereupon, while the hand-grip end of the bell crank lever 9 is pulled by the operator toward the handle of the fulcrum lever 5, the entire tool is swung downwardly about the lower portion of the loop 20c as a fulcrum to not only tightly tension all portions of the wire 20, and in particular the loop 20a thereof, at the same time that the loop 20a is being crimped downwardly over the lower portion of the loop 20c. In other words, pressure is applied due to the action of the bell crank lever 9 to draw the hooking bar 8 toward the handle end of the tool while swinging it laterally away from the fulcrum lever 5 at the same time that the crimp is being made in the loop 20a, and thus the two ends of the wire 20 are very tightly secured together while one looped end portion of the wire is crimped downwardly against the other looped end portion of the wire. It is thus possible to very tightly secure the box by the wire 20 while the wire is tensioned so that no possible play can take place between the top 17 of the box and the side 15 of the box when the various wires holding the box together are secured as described. With other wire box closing tools now employed for the purpose, proper tensioning of the wire is not secured at the same time that the crimping of one looped end portion over another looped end portion of the wire is done, and thus the present tool has many advantages over tools now in use in securing a tight closure of wire bound boxes.

Referring now to the tool shown in Fig. 4, this tool includes a fulcrum bar 22, which is constructed generally similar to the bar 5 previously described, and the bar 22 carries at its rear end hand grips 23. A hooking bar 24 similar to the bar 8 previously described is provided, and the rear end of the bar 24 is connected by pivot stud 25 to a bell crank lever 26 similar to the lever 9 previously described. The bell crank lever 26 is connected by a pivot stud 27 to the fulcrum bar 22. A U-shaped keeper 29 is secured by bolts 28 to the hooking bar 24 and this keeper works over the fulcrum bar 22. The operation of the tool shown in Fig. 4 corresponds to the operation of the tool shown in Figs. 1, 2, and 3 with the exception that in the case of the tool shown in Fig. 4 the hooking bar 24 has merely a longitudinal sliding movement relative to the fulcrum bar 22 when the bell crank lever 26 is actuated and the hooking bar 24 has no lateral movement relative to the fulcrum bar 22 during actuation of the bell crank lever 26. The tool shown in Figs. 1 to 3, due to the lateral movement of the hooking bar 8 relative to the fulcrum bar 5 as the bell crank lever 9 is actuated, has some advantages therefore over the tool shown in Fig. 4. The lateral spreading action of the forward part of the hooking bar 8 relative to the fulcrum bar 5 tends to further tension the wire during the swinging movement of the tool shown in Figs. 1 to 3.

It will be seen that a very simple and highly efficient wire bound box closing tool has been provided in accordance with the present invention.

It will of course be understood that various changes may be made in the form, details, arrangement, and proportions of the various parts without departure from the scope of the present invention which, generally stated, consists in the matter shown and described and set forth in the appended claims.

What is claimed is:

1. A wire bound box closing tool comprising a fulcrum bar having a forward portion terminating in a notched forward end and having a handle forming rear end, a wire hooking bar extending longitudinally of said fulcrum bar along one side thereof and having a number of wire receiving notches in its outer edge, said forward portion of the fulcrum bar tapering forwardly toward the side adjacent which said wire hooking bar extends, means guidably mounting said hooking bar on said fulcrum bar for longitudinal sliding movement and a hand-grip lever operable from the rear end of said fulcrum bar for longitudinally sliding said hooking bar relative to said fulcrum bar.

2. A wire bound box closing tool comprising a fulcrum bar having a tapered forward portion terminating in a notched forward end, said fulcrum bar forming a handle at its rear end, a hooking bar located adjacent one side of said fulcrum bar and having at one edge thereof a number of wire engaging hooking notches therein, a link pivotally connected to said two bars, a bell crank lever having one end pivoted to said fulcrum bar having an intermediate portion pivotally connected to said hooking bar and having its other end located adjacent said handle end of said fulcrum bar whereby said hooking bar can be moved both longitudinally and laterally relative to the fulcrum bar.

3. A wire bound box closing tool comprising a fulcrum bar having a tapered forward portion terminating in a notched forward end and having a handle forming rear end, a wire hooking bar extending longitudinally of said fulcrum bar along one side thereof and having a number of wire receiving notches in its outer edge, the forward portion of said hooking bar being of tapered construction, means guidably mounting said hooking bar on said fulcrum bar for longitudinal sliding movement and a hand grip lever operable from the rear end of said fulcrum bar for longitudinally sliding said hooking bar relative to said fulcrum bar.

GEORGE T. BOYD.
HENRY T. BOYD.

REFERENCES CITED

The following references are of record in the file of this patent:

UNITED STATES PATENTS

| Number | Name | Date |
| --- | --- | --- |
| 253,089 | O'Connell, Jr. | Jan. 31, 1882 |
| 761,151 | Cummings | May 31, 1904 |
| 1,012,282 | Schlangen | Dec. 19, 1911 |
| 1,305,899 | Hazel | June 3, 1919 |
| 2,188,161 | Rosenmund | Jan. 23, 1940 |